US011804786B2

(12) United States Patent
Uemura et al.

(10) Patent No.: US 11,804,786 B2
(45) Date of Patent: Oct. 31, 2023

(54) POWER CONVERTING APPARATUS, MOTOR DRIVING APPARATUS, AND AIR CONDITIONER

(71) Applicant: Mitsubishi Electric Corporation, Tokyo (JP)

(72) Inventors: Keisuke Uemura, Tokyo (JP); Satoru Ichiki, Tokyo (JP); Takuya Shimomugi, Tokyo (JP); Koichi Arisawa, Tokyo (JP); Kenji Iwazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 460 days.

(21) Appl. No.: 17/270,564

(22) PCT Filed: Sep. 28, 2018

(86) PCT No.: PCT/JP2018/036610
§ 371 (c)(1),
(2) Date: Feb. 23, 2021

(87) PCT Pub. No.: WO2020/066033
PCT Pub. Date: Apr. 2, 2020

(65) Prior Publication Data
US 2021/0203246 A1 Jul. 1, 2021

(51) Int. Cl.
*H02P 27/08* (2006.01)
*H02M 7/219* (2006.01)
(Continued)

(52) U.S. Cl.
CPC ........... *H02M 7/219* (2013.01); *F25B 31/026* (2013.01); *H02M 1/083* (2013.01); *H02M 1/38* (2013.01);
(Continued)

(58) Field of Classification Search
CPC ........ H02M 7/219; H02M 1/083; H02M 1/38; H02M 1/44; H02M 1/0058; H02P 27/08; F25B 31/026
See application file for complete search history.

(56) References Cited

U.S. PATENT DOCUMENTS 5,416,686 A * 5/1995 Azuma ................. H02M 5/458
363/37
5,905,642 A * 5/1999 Hammond .......... H02M 5/4505
363/39
(Continued)

FOREIGN PATENT DOCUMENTS

JP          2015-139301 A          7/2015
JP          2016-039680 A          3/2016
JP          2018-007326 A          1/2018

*Primary Examiner* — Rina I Duda
(74) *Attorney, Agent, or Firm* — POSZ LAW GROUP, PLC

(57) ABSTRACT

A power converting apparatus includes: a bridge circuit that includes at least two legs each including switching elements connected in series, and converts an alternating-current voltage output from an alternating-current power supply into a direct-current voltage; a power-supply current detecting unit that detects a current from the alternating-current power supply; a zero crossing detecting unit that detects a voltage polarity of the alternating-current power supply; and a control unit that controls ON and OFF of the switching elements depending on outputs of the power-supply current detecting unit and the zero crossing detecting unit, in which a dead time that is set for switching and includes a change in the voltage polarity of the alternating-current power supply is longer than a dead time that is set for switching and does not include a change in the polarity.

12 Claims, 13 Drawing Sheets

(51) Int. Cl.
   *F25B 31/02* (2006.01)
   *H02M 1/08* (2006.01)
   *H02M 1/38* (2007.01)
   *H02M 1/44* (2007.01)
   *H02M 1/00* (2006.01)

(52) U.S. Cl.
   CPC .............. *H02M 1/44* (2013.01); *H02P 27/08* (2013.01); *H02M 1/0058* (2021.05)

(56) References Cited

U.S. PATENT DOCUMENTS

| | | | | |
|---|---|---|---|---|
| 6,181,583 | B1* | 1/2001 | Okui | H02M 1/4208 |
| | | | | 363/45 |
| 8,212,506 | B2* | 7/2012 | Iwahori | B60L 50/13 |
| | | | | 318/148 |
| 8,498,136 | B2* | 7/2013 | Shinomoto | H02M 1/4208 |
| | | | | 363/125 |
| 8,508,165 | B2* | 8/2013 | Shinomoto | H02M 1/4233 |
| | | | | 318/432 |
| 8,823,303 | B2* | 9/2014 | Shinomoto | H02M 7/2176 |
| | | | | 318/400.29 |
| 9,252,654 | B1 | 2/2016 | Tomioka | |
| 2003/0086231 | A1* | 5/2003 | Asaeda | H02M 1/38 |
| | | | | 361/93.9 |
| 2009/0160382 | A1* | 6/2009 | Hwang | F24F 11/30 |
| | | | | 318/400.26 |
| 2014/0225552 | A1* | 8/2014 | Shinomoto | B60L 50/51 |
| | | | | 318/504 |

* cited by examiner

POWER CONVERTING APPARATUS, MOTOR DRIVING APPARATUS, AND AIR CONDITIONER

CROSS REFERENCE TO RELATED APPLICATION

This application is a U.S. national stage application of International Patent Application No. PCT/JP2018/036610 filed on Sep. 28, 2018, the disclosure of which is incorporated herein by reference.

TECHNICAL FIELD

The present invention relates to a power converting apparatus that converts an alternating-current power into a direct-current power, a motor driving apparatus, and an air conditioner.

BACKGROUND

Power converting apparatuses that convert a supplied alternating-current power into a direct-current power by using a bridge circuit constituted by switching elements and output the direct-current power are present. Such a power converting apparatus is capable of performing a voltage raising operation of raising the voltage of the alternating-current power and a synchronous rectification operation of rectifying the alternating-current power by turning the switching elements ON and OFF.

Patent Literature 1 discloses a technology for a power converting apparatus to control four switching elements depending on the voltage of an alternating-current power supplied from an alternating-current power supply and the current flowing in the alternating-current power supply, in which two of the switching elements are controlled depending on the polarity of the voltage and the other two of the switching elements are controlled depending on the polarity of the current. In controlling the two switching elements depending on the polarity of the voltage, the power converting apparatus described in Patent Literature 1 turns ON one switching element and turns OFF the other switching element when the polarity of the voltage is positive, or turns OFF the one switching element and turns ON the other switching element when the polarity of the voltage is negative. The power converting apparatus described in Patent Literature 1 detects switching between positive and negative of the voltage of the alternating-current power supply, that is, a zero crossing, and controls ON and OFF of the switching elements.

PATENT LITERATURE

Patent Literature 1: Japanese Patent Application Laid-open No. 2018-7326

An alternating-current power supplied from an alternating-current power supply may contain noise. If a zero crossing is erroneously detected owing to the influence of noise included in an alternating-current power, the power converting apparatus described in Patent Literature 1 may malfunction by performing switching control at a false timing. In a power converting apparatus, malfunctions cause an increase in loss, an increase in harmonic component of a power-supply current flowing in the power converting apparatus, and the like. In such cases, noise can be removed by using a low-pass filter. In the power converting apparatus described in Patent Literature 1, however, when a low-pass filter is used for removing noise in an alternating-current power, a transmission delay of a signal occurs owing to an electrical time constant of elements constituting the low-pass filter, and the detection is delayed with respect to an actual zero crossing of the voltage of an alternating-current power. Thus, the power converting apparatus described in Patent Literature 1 has a problem in that, when a low-pass filter is used, there is a possibility that the switching elements cannot be turned ON and OFF with changes in the polarity of the voltage of an actual alternating-current power, and malfunctions are caused.

SUMMARY

The present invention has been made in view of the above, and an object thereof is to provide a power converting apparatus capable of controlling ON and OFF of switching elements depending on the polarity of the voltage of an alternating-current power while reducing or preventing malfunctions.

A power converting apparatus according to an aspect of the present invention includes: a bridge circuit including at least two legs each including switching elements connected in series, the bridge circuit converting an alternating-current voltage output from an alternating-current power supply into a direct-current voltage; a current detecting unit detecting a current from the alternating-current power supply; a zero crossing detecting unit detecting a voltage polarity of the alternating-current power supply; and a control unit controlling ON and OFF of the switching elements depending on outputs of the current detecting unit and the zero crossing detecting unit, wherein a dead time being set for switching and including a change in the voltage polarity of the alternating-current power supply is longer than a dead time being set for switching and not including a change in the polarity.

A power converting apparatus according to the present invention produces an effect of allowing control of ON and OFF of switching elements depending on the polarity of the voltage of an alternating-current power while reducing or preventing malfunctions.

DETAILED DESCRIPTION

A power converting apparatus, a motor driving apparatus, and an air conditioner according to embodiments of the present invention will be described in detail below with reference to the drawings. Note that the present invention is not limited to the embodiments.

First Embodiment

Figure 1:
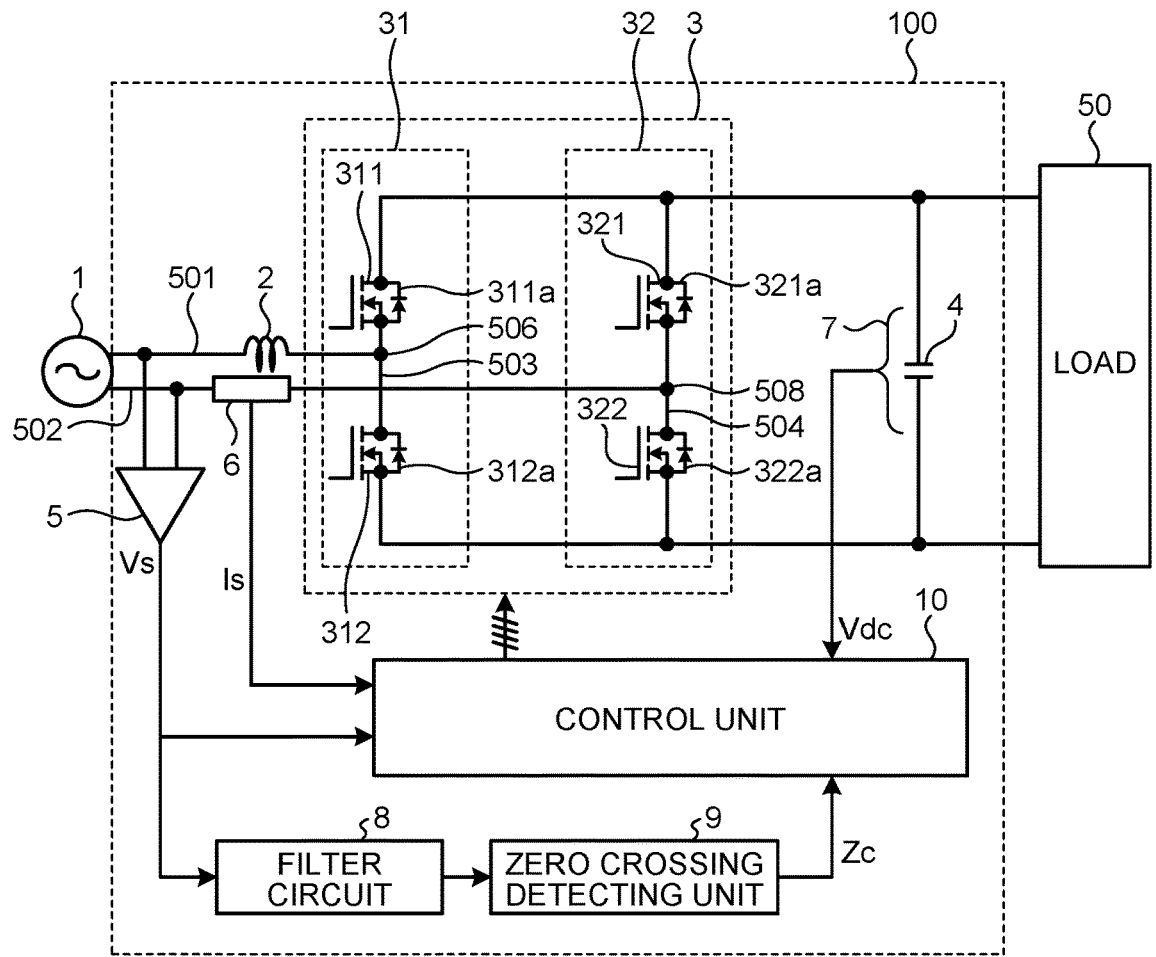
FIG. 1 is a diagram illustrating an example of a configuration of a power converting apparatus according to a first embodiment.

FIG. 1 is a diagram illustrating an example of a configuration of a power converting apparatus 100 according to a first embodiment of the present invention. The power converting apparatus 100 is a power supply device having an AC-DC converting function for converting an alternating-current power supplied from an alternating-current power supply 1 into a direct-current power and applying the direct-current power to a load 50 by using a bridge circuit 3. As illustrated in FIG. 1, the power converting apparatus 100 includes a reactor 2, the bridge circuit 3, a smoothing capacitor 4, a power-supply voltage detecting unit 5, a power-supply current detecting unit 6, a bus voltage detecting unit 7, a filter circuit 8, a zero crossing detecting unit 9, and a control unit 10.

The bridge circuit 3 is a circuit including two arms connected in parallel with each other. Each of the arms includes two switching elements connected in series with each other, and each of the switching elements is connected in parallel with a diode. The bridge circuit 3 converts an alternating-current voltage output from the alternating-current power supply 1 into a direct-current voltage. Specifically, the bridge circuit 3 includes a first arm 31, which is a first circuit, and a second arm 32, which is a second circuit. The first arm 31 includes a switching element 311 and a switching element 312, which are connected in series. A parasitic diode 311a is formed in the switching element 311. The parasitic diode 311a is connected in parallel between a drain and a source of the switching element 311. A parasitic diode 312a is formed in the switching element 312. The parasitic diode 312a is connected in parallel between a drain and a source of the switching element 312. Each of the parasitic diodes 311a and 312a is a diode used as a freewheeling diode. Note that the first arm 31 may also be referred to as a leg.

The second arm 32 incudes a switching element 321 and a switching element 322, which are connected in series. The second arm 32 is connected in parallel with the first arm 31. A parasitic diode 321a is formed in the switching element 321. The parasitic diode 321a is connected in parallel between a drain and a source of the switching element 321. A parasitic diode 322a is formed in the switching element 322. The parasitic diode 322a is connected in parallel between a drain and a source of the switching element 322. Each of the parasitic diodes 321a and 322a is a diode used as a freewheeling diode. Note that the second arm 32 may also be referred to as a leg. The bridge circuit 3 may include three or more arms, that is, legs, and includes at least two or more legs.

Specifically, the power converting apparatus 100 incudes a first line 501 and a second line 502, which are each connected to the alternating-current power supply 1, and the reactor 2 disposed on the first line 501. In addition, the first arm 31 includes the switching element 311 which is a first switching element, the switching element 312 which is a second switching element, and a third line 503 having a first connection point 506. The switching element 311 is connected in series to the switching element 312 by the third line 503. The first line 501 is connected to the first connection point 506. The first connection point 506 is connected to the alternating-current power supply 1 via the first line 501 and the reactor 2.

The second arm 32 includes the switching element 321 which is a third switching element, the switching element 322 which is a fourth switching element, and a fourth line 504 having a second connection point 508, in which the switching element 321 is connected in series to the switching element 322 by the fourth line 504. The second line 502 is connected to the second connection point 508. The second connection point 508 is connected to the alternating-current power supply 1 via the second line 502.

The smoothing capacitor 4 is a capacitor connected in parallel with the bridge circuit 3, or more specifically, with the second arm 32. In the bridge circuit 3, one terminal of the switching element 311 is connected to the positive side of the smoothing capacitor 4, the other terminal of the switching element 311 is connected to one terminal of the switching element 312, and the other terminal of the switching element 312 is connected to the other terminal of the smoothing capacitor 4.

The switching elements 311, 312, 321, and 322 are constituted by MOSFETs. For the switching elements 311, 312, 321, and 322, MOSFETs made of wide band gap (WBG) semiconductors such as gallium nitride (GaN), silicon carbide (SiC), diamond, or aluminum nitride can be used. Use of the WBG semiconductors for the switching elements 311, 312, 321, and 322 increases the withstand voltage characteristics and also increases the allowable current density, thereby allows miniaturization of modules. Because the WBG semiconductors also have high heat resistance, radiating fins in a radiating unit can also be miniaturized.

The control unit 10 generates driving pulses for causing the switching elements 311, 312, 321, and 322 of the bridge circuit 3 to operate on the basis of signals output from each of the power-supply voltage detecting unit 5, the power-supply current detecting unit 6, the bus voltage detecting unit 7, and the zero crossing detecting unit 9. The power-supply voltage detecting unit 5 is a voltage detecting unit that detects a power-supply voltage Vs, which is a voltage value of a voltage output from the alternating-current power supply 1, and outputs an electrical signal indicating the detection result to the control unit 10. The power-supply voltage Vs may also be referred to as a first output voltage. The power-supply current detecting unit 6 is a current detecting unit that detects a power-supply current Is, which is a current value of a current output from the alternating-current power supply 1, and outputs an electrical signal indicating the detection result to the control unit 10. The power-supply current Is is a current value of a current flowing between the alternating-current power supply 1 and the bridge circuit 3. The bus voltage detecting unit 7 is a voltage detecting unit that detects a bus voltage Vdc, and outputs an electrical signal indicating the detection result to the control unit 10. The bus voltage Vdc is a voltage obtained by smoothing a voltage output from the bridge circuit 3 by the smoothing capacitor 4.

The filter circuit 8 removes noise from the power-supply voltage Vs detected by the power-supply voltage detecting unit 5. The filter circuit 8 outputs a power-supply voltage signal resulting from noise removal to the control unit 10. The power-supply voltage signal may also be referred to as a second output voltage. The zero crossing detecting unit 9 detects switching between positive and negative, that is, a zero crossing of the power-supply voltage signal obtained by noise removal by the filter circuit 8. The zero crossing detecting unit 9 can also be interpreted to detect the voltage polarity of the alternating-current power supply 1. The zero crossing detecting unit 9 outputs a zero crossing signal Zc indicating a timing of the detected zero crossing to the control unit 10. Note that the zero crossing detecting unit 9 may have a configuration including the filter circuit 8. The zero crossing signal Zc is high when the polarity of the power-supply voltage signal is positive, and low when the polarity of the power-supply voltage signal is negative. Thus, the timing when the zero crossing signal Zc switches from low to high is the timing when the polarity of the power-supply voltage signal switches from negative to positive, and the timing when the zero crossing signal Zc switches from high to low is the timing when the polarity of the power-supply voltage signal switches from positive to negative. Note that the zero crossing signal Zc described above is an example, and the zero crossing signal Zc may indicate low when the polarity of the power-supply voltage signal is positive, and high when the polarity of the operating voltage signal is negative. The control unit 10 controls ON and OFF of the switching elements 311, 312, 321, and 322 depending on the power-supply voltage Vs, the power-supply current Is, the bus voltage Vdc, and the zero crossing signal Zc. Note that the control unit 10 may control ON and OFF of the switching elements 311, 312, 321, and 322 by using at least one of the power-supply voltage Vs, the power-supply current Is, the bus voltage Vdc, and the zero crossing signal Zc.

Next, basic operation of the power converting apparatus 100 according to the first embodiment will be described. Hereinafter, the switching elements 311 and 321 connected to the positive side of the alternating-current power supply 1, that is, a positive terminal of the alternating-current power supply 1 may also be referred to as upper switching elements. In addition, the switching elements 312 and 322 connected to the negative side of the alternating-current power supply 1, that is, a negative terminal of the alternating-current power supply 1 may also be referred to as lower switching elements.

In the second arm 32, the upper switching element and the lower switching element operate complementarily. Specifically, when one of the upper switching element and the lower switching element is ON, the other is OFF. As will be described later, the switching elements 321 and 322 constituting the second arm 32 are driven by pulse width modulation (PWM) signals that are driving signals generated by the control unit 10. The operations of turning the switching elements 321 and 322 ON or OFF in accordance with the PWM signals will hereinafter also be referred to as switching operations. In order to prevent a short circuit of the smoothing capacitor 4 via the alternating-current power supply 1, the switching element 321 and the switching element 322 are both OFF when the absolute value of the power-supply current Is output from the alternating-current power supply 1 is equal to or smaller than a current threshold. Hereinafter, the short circuit of the smoothing capacitor 4 will be referred to as a capacitor short circuit. The capacitor short circuit is a state in which the energy stored in the smoothing capacitor 4 is released and the current is regenerated back to the alternating-current power supply 1.

The switching elements 311 and 312 constituting the first arm 31 are turned ON or OFF by driving signals generated by the control unit 10. Basically, the switching elements 311 and 312 are turned ON or OFF depending on a power-supply voltage polarity that is the polarity of a voltage output from the alternating-current power supply 1. Specifically, when the power-supply voltage polarity is positive, the switching element 311 is ON and the switching element 312 is OFF, and when the power-supply voltage polarity is negative, the switching element 312 is ON and the switching element 311 is OFF. Note that, in FIG. 1, an arrow extending from the control unit 10 toward the bridge circuit 3 represents driving signals for controlling ON and OFF of the switching elements 311 and 312, and the aforementioned PWM signals for controlling ON and OFF of the switching elements 321 and 322.

As described above, the control unit 10 controls ON and OFF of the switching elements 311 and 312 of the first arm 31 depending on the polarity of the voltage of an alternating-current power from the alternating-current power supply 1, and controls ON and OFF of the switching elements 321 and 322 of the second arm 32 depending on the polarity of the current of an alternating-current power from the alternating-current power supply 1.

Next, the relation between the states of the switching elements in the first embodiment and the path of current flowing in the power converting apparatus 100 according to the first embodiment will be explained. Note that the structure of the MOSFETs will be described with reference to FIG. 2 before the explanation.

Figure 2:
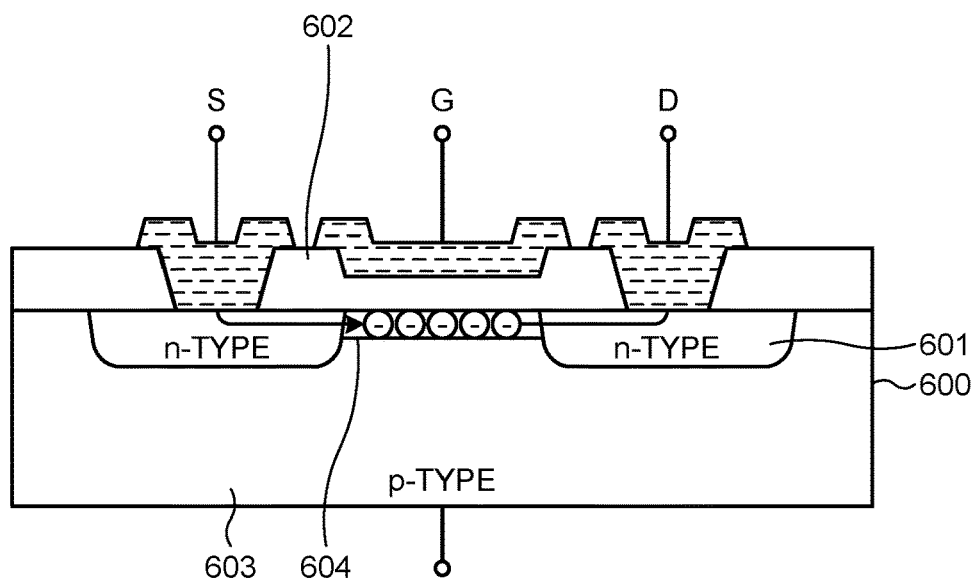
FIG. 2 is a schematic cross-sectional view illustrating an outline structure of a MOSFET.

FIG. 2 is a schematic cross-sectional view illustrating an outline structure of a MOSFET. FIG. 2 illustrates an example of an n-type MOSFET. In an n-type MOSFET, a p-type semiconductor substrate 600 is used as illustrated in FIG. 2. A source electrode S, a drain electrode D, and a gate electrode G are formed on the semiconductor substrate 600. High-concentration impurity is introduced by ion implantation into portions in contact with the source electrode S and the drain electrode D to form n-type regions 601. In addition, an insulating oxide layer 602 is formed between a portion of the semiconductor substrate 600 where no n-type region 601 is formed and the gate electrode G. Thus, the insulating oxide layer 602 is present between the gate electrode G and a p-type region 603 of the semiconductor substrate 600.

When a positive voltage is applied to the gate electrode G, electrons are attracted to an interface between the p-type region 603 and the insulating oxide layer 602 of the semiconductor substrate 600, and the interface is negatively charged. The electron density of a portion where electrons have gathered becomes higher than a hole density, and the portion becomes n-type. The portion that has become n-type becomes a current path, and will be referred to as a channel 604. The channel 604 is an n-type channel in the example of FIG. 2. When the MOSFET is controlled to be ON, more current flows to the channel 604 than to a parasitic diode formed in the p-type region 603.

Figure 3:
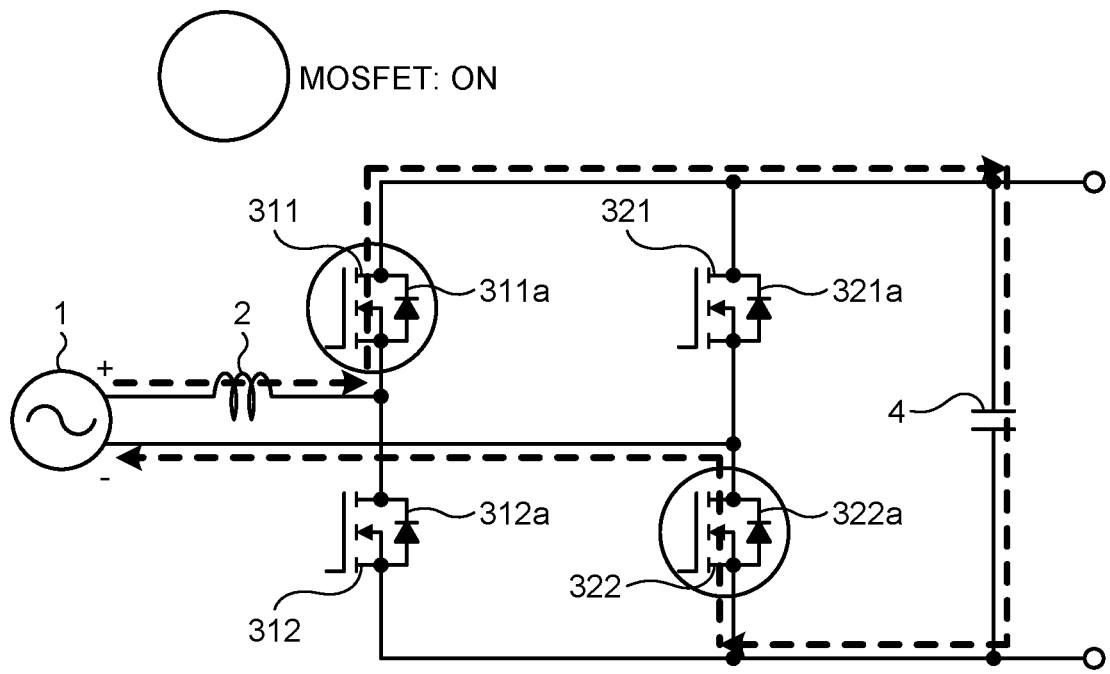
FIG. 3 is a first diagram illustrating a path of current flowing in the power converting apparatus according to the first embodiment when the absolute value of a power-supply current is larger than a current threshold and a power-supply voltage polarity is positive.

FIG. 3 is a first diagram illustrating a path of current flowing in the power converting apparatus 100 according to the first embodiment when the absolute value of the power-supply current Is is larger than the current threshold and the power-supply voltage polarity is positive. In FIG. 3, the power-supply voltage polarity is positive, the switching element 311 and the switching element 322 are ON, and the switching element 312 and the switching element 321 are OFF. In this state, current flows in the order of the alternating-current power supply 1, the reactor 2, the switching element 311, the smoothing capacitor 4, the switching element 322, and the alternating-current power supply 1. Thus, in the first embodiment, a synchronous rectification operation is performed in such a manner that current flows through each of the channels of the switching element 311 and the switching element 322 instead of flowing through the parasitic diode 311a and the parasitic diode 322a. Note that, in FIG. 3, the switching elements that are ON are indicated by circles. The same applies to subsequent drawings.

Figure 4:
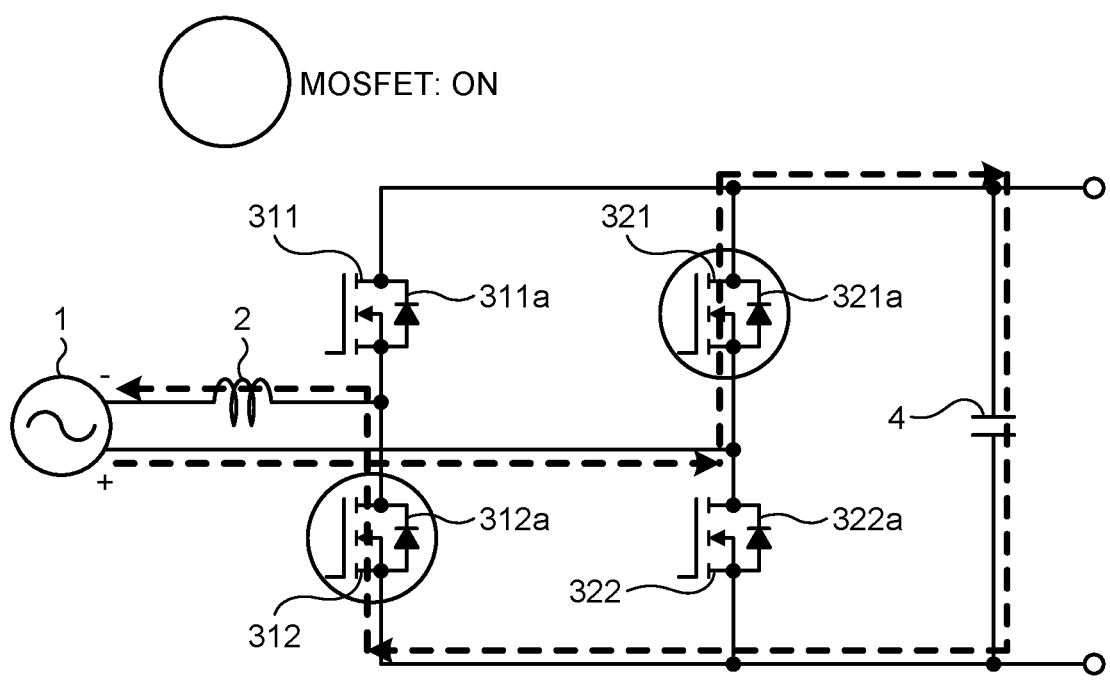
FIG. 4 is a first diagram illustrating a path of current flowing in the power converting apparatus according to the first embodiment when the absolute value of the power-supply current is larger than the current threshold and the power-supply voltage polarity is negative.

FIG. 4 is a first diagram illustrating a path of current flowing in the power converting apparatus 100 according to the first embodiment when the absolute value of the power-supply current Is is larger than the current threshold and the power-supply voltage polarity is negative. In FIG. 4, the power-supply voltage polarity is negative, the switching element 312 and the switching element 321 are ON, and the switching element 311 and the switching element 322 are OFF. In this state, current flows in the order of the alternating-current power supply 1, the switching element 321, the smoothing capacitor 4, the switching element 312, the reactor 2, and the alternating-current power supply 1. Thus, in the first embodiment, a synchronous rectification operation is performed in such a manner that current flows through each of the channels of the switching element 321 and the switching element 312 instead of flowing through the parasitic diode 321a and the parasitic diode 312a.

Figure 5:
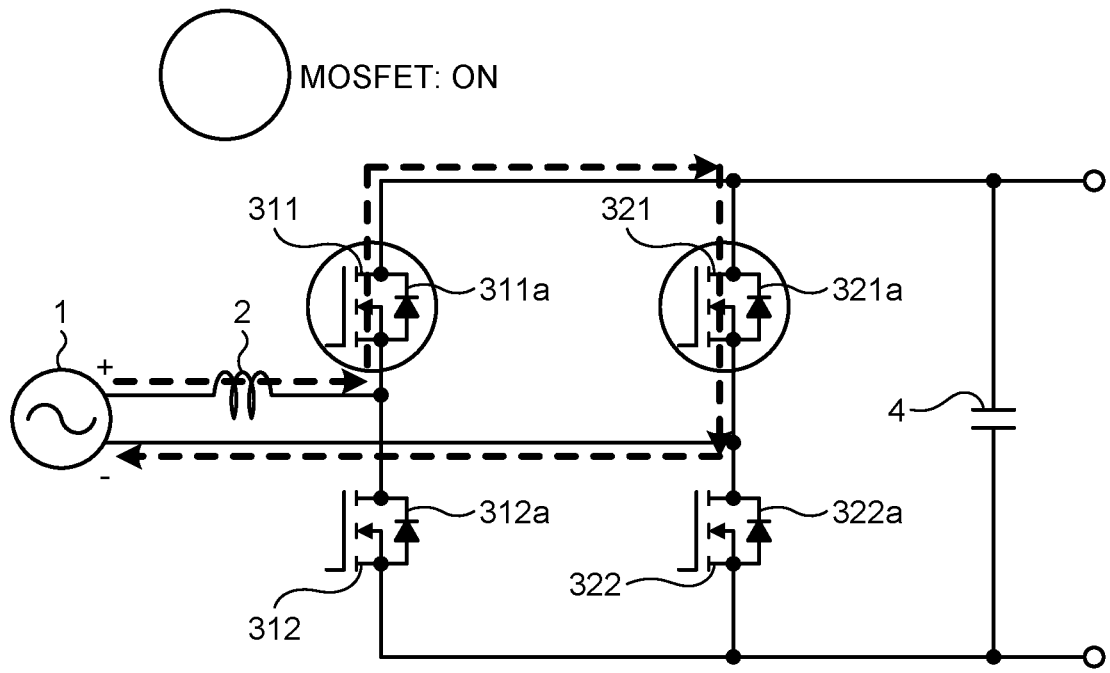
FIG. 5 is a second diagram illustrating a path of current flowing in the power converting apparatus according to the first embodiment when the absolute value of the power-supply current is larger than the current threshold and the power-supply voltage polarity is positive.

FIG. 5 is a second diagram illustrating a path of current flowing in the power converting apparatus 100 according to the first embodiment when the absolute value of the power-supply current Is is larger than the current threshold and the power-supply voltage polarity is positive. In FIG. 5, the power-supply voltage polarity is positive, the switching element 311 and the switching element 321 are ON, and the switching element 312 and the switching element 322 are OFF. In this state, current flows in the order of the alternating-current power supply 1, the reactor 2, the switching element 311, the switching element 321, and the alternating-current power supply 1, and a power supply short-circuit path that does not pass through the smoothing capacitor 4 is formed. Thus, in the first embodiment, the power supply short-circuit path is formed in such a manner that current flows through each of the channels of the switching element 311 and the switching element 321 instead of flowing through the parasitic diode 311a and the parasitic diode 321a.

Figure 6:
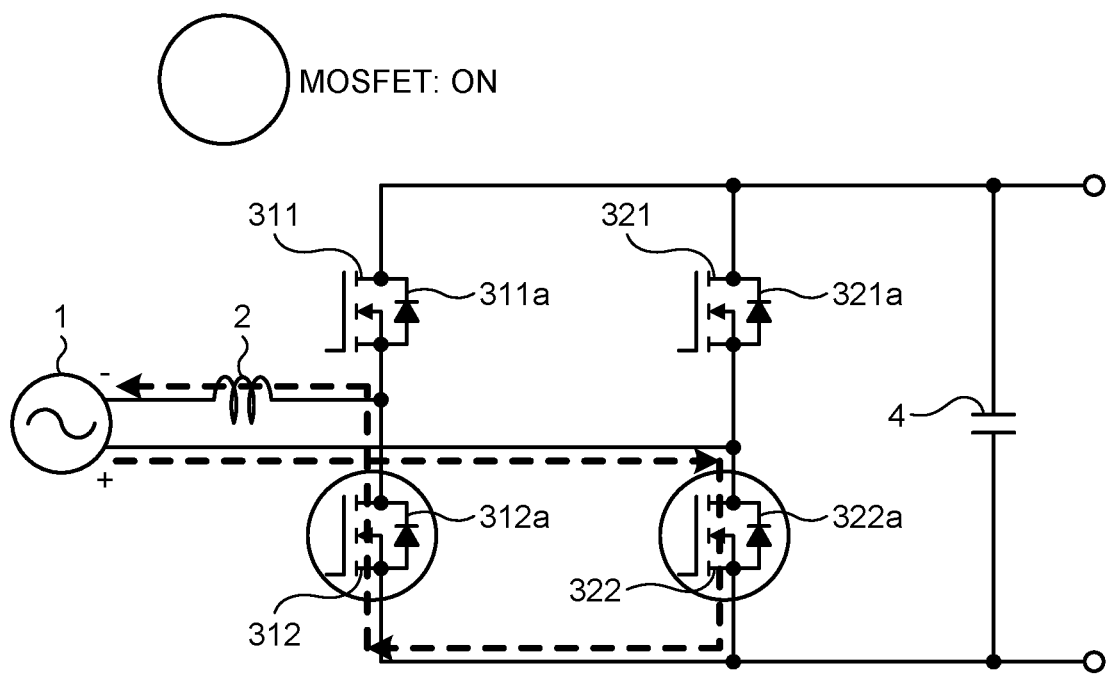
FIG. 6 is a second diagram illustrating a path of current flowing in the power converting apparatus according to the first embodiment when the absolute value of the power-supply current is larger than the current threshold and the power-supply voltage polarity is negative.

FIG. 6 is a second diagram illustrating a path of current flowing in the power converting apparatus 100 according to the first embodiment when the absolute value of the power-supply current Is is larger than the current threshold and the power-supply voltage polarity is negative. In FIG. 6, the power-supply voltage polarity is negative, the switching element 312 and the switching element 322 are ON, and the switching element 311 and the switching element 321 are OFF. In this state, current flows in the order of the alternating-current power supply 1, the switching element 322, the switching element 312, the reactor 2, and the alternating-current power supply 1, and a power supply short-circuit path that does not pass through the smoothing capacitor 4 is formed. Thus, in the first embodiment, the power supply short-circuit path is formed in such a manner that current flows through each of the channels of the switching element 322 and the switching element 312 instead of flowing through the parasitic diode 322a and the parasitic diode 312a.

The control unit 10 can control the values of the power-supply current Is and the bus voltage Vdc by controlling switching among the current paths described above. The power converting apparatus 100 performs operations such as increase of the bus voltage Vdc and synchronous rectification of the power-supply current Is, by continuously switching between a load power supply mode illustrated in FIG. 3 and a power supply short-circuit mode illustrated in FIG. 5 when the power-supply voltage polarity is positive, and continuously switching between a load power supply mode illustrated in FIG. 4 and a power supply short-circuit mode illustrated in FIG. 6 when the power-supply voltage polarity is negative. Specifically, the control unit 10 controls ON and OFF of the switching elements 311, 312, 321, and 322 with a switching frequency of the switching elements 321 and 322, which perform switching operations by the PWM, being higher than a switching frequency of the switching elements 311 and 312, which perform switching operations depending on the polarity of the power-supply voltage Vs. In the description below, the switching elements 311, 312, 321, and 322 may simply be referred to as switching elements when the switching elements 311, 312, 321, and 322 are not distinguished from one another. Similarly, the parasitic diodes 311a, 312a, 321a, and 322a may simply be referred to as parasitic diodes when the parasitic diodes 311a, 312a, 321a, and 322a are not distinguished from one another.

Figure 7:
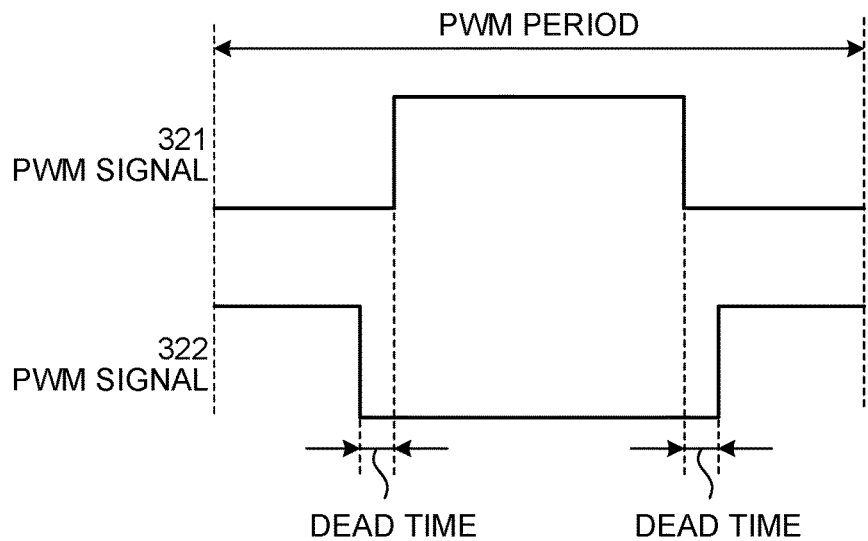
FIG. 7 is a diagram illustrating an example of PWM signals generated for switching elements by a control unit of the power converting apparatus according to the first embodiment.

Next, the timings at which the control unit 10 turns the switching elements ON and OFF will be explained. First, the timings at which the control unit 10 turns the switching elements 321 and 322 ON and OFF will be explained. As described above, the control unit 10 performs switching operations based on the PWM control on the switching elements 321 and 322. Typically, in a configuration in which two switching elements are connected in series, dead times during which the two switching elements are both OFF are set in view of delays in switching processes so that the two switching elements will not be both ON. In the present embodiment as well, the control unit 10 sets dead times for the switching elements 321 and 322, for performing switching operations based on pulse width modulation, that is, the PWM control. FIG. 7 is a diagram illustrating an example of PWM signals generated for the switching elements 321 and 322 by the control unit 10 of the power converting apparatus 100 according to the first embodiment. In FIG. 7, upper part illustrates a PWM signal for the switching element 321, and lower part illustrates a PWM signal for the switching element 322. In addition, a high level of each of the PWM signals indicates an ON state of the switching element, and a low level thereof indicates an OFF state of the switching element. As illustrated in FIG. 7, the control unit 10 generates each PWM signal with dead times set between periods during which the switching element 321 is ON and periods during which the switching element 322 is ON so that the switching elements 321 and 322 will not be both ON.

The timings at which the control unit 10 turns the switching elements 311 and 312 ON and OFF will be explained. The control unit 10 detects switching between positive and negative of the power-supply voltage from the alternating-current power supply 1 on the basis of the zero crossing signal Zc output from the zero crossing detecting unit 9. The power-supply voltage Vs detected by the power-supply voltage detecting unit 5, however, is input to the zero crossing detecting unit 9 via the filter circuit 8. Because a transmission delay of a signal occurs at the filter circuit 8, a signal of the power-supply voltage is input to the zero crossing detecting unit 9 at a timing that is delayed with respect to the timing at which the power-supply voltage Vs is detected by the power-supply voltage detecting unit 5. The necessity of the filter circuit 8 in the power converting apparatus 100 will now be explained.

Figure 8:
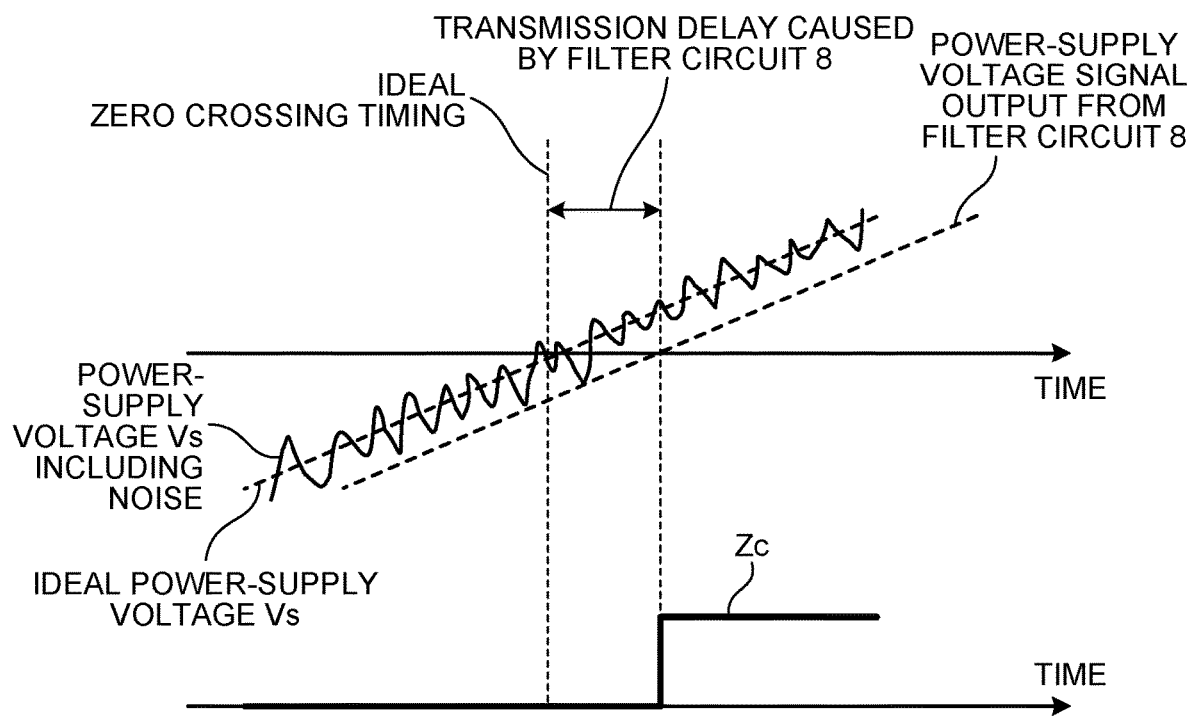
FIG. 8 is a chart illustrating an example of a transmission delay occurring at a filter circuit of the power converting apparatus according to the first embodiment.

FIG. 8 is a chart illustrating an example of a transmission delay occurring at the filter circuit 8 of the power converting apparatus 100 according to the first embodiment. In a case where no noise is included in an alternating-current power output from the alternating-current power supply 1, the power-supply voltage detecting unit 5 detects an "ideal power-supply voltage Vs" illustrated in FIG. 8. If the "ideal power-supply voltage Vs" is used for zero crossing detection, the zero crossing detecting unit 9 detects a zero crossing at an "ideal zero crossing timing" illustrated in FIG. 8. An alternating-current power actually output from the alternating-current power supply 1, however, may contain noise. In this case, if an "power-supply voltage Vs including noise" illustrated in FIG. 8 is used for zero crossing detection, the zero crossing detecting unit 9 outputs a zero crossing signal Zc including chattering. When a zero crossing signal Zc includes chattering, the control unit 10 cannot correctly obtain a change in the polarity of the power-supply voltage Vs, which is a factor of malfunctions in the control by the power converting apparatus 100.

The power converting apparatus 100 thus uses the filter circuit 8 to remove noise included in an alternating-current power output from the alternating-current power supply 1.

Figure 9:
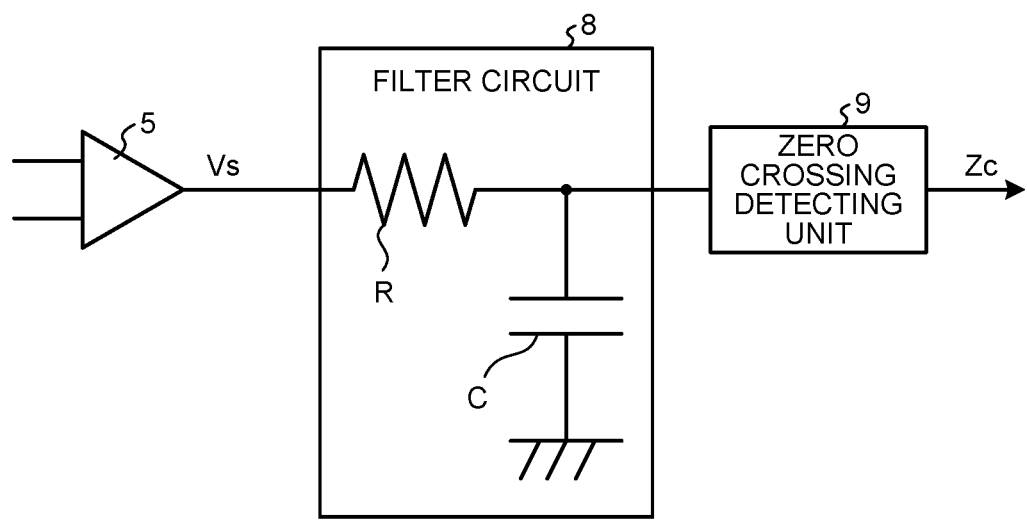
FIG. 9 is a diagram illustrating an example of a configuration of the filter circuit of the power converting apparatus according to the first embodiment.

FIG. 9 is a diagram illustrating an example of a configuration of the filter circuit 8 of the power converting apparatus 100 according to the first embodiment. The filter circuit 8 is implemented by a CR circuit constituted by a capacitor C and a resistor R, that is a so-called low-pass filter circuit. In the power converting apparatus 100, although noise included in the power-supply voltage Vs can be removed by the filter circuit 8, a transmission delay of a signal is caused by the influence of a time constant obtained from the values of the resistor R and the capacitor C of the filter circuit 8. Specifically, as illustrated in FIG. 8, when the "power-supply voltage Vs including noise" is input, the filter circuit 8 removes the noise, and outputs an "power-supply voltage signal output from filter circuit 8" illustrated in FIG. 8 with a delay corresponding to a "transmission delay caused by filter circuit 8" from the "ideal zero crossing timing".

As a result, the zero crossing detecting unit 9 can obtain a power-supply voltage signal that does not include noise, and can thus output a zero crossing signal Zc that does not include chattering. The zero crossing detecting unit 9, however, obtains the "power-supply voltage signal output from filter circuit 8" that is delayed by the "transmission delay caused by filter circuit 8" from the "ideal zero crossing timing", and thus outputs a zero crossing signal Zc that is delayed by "the transmission delay caused by filter circuit 8". As a result, if the control unit 10 performs control of the switching elements on the basis of the zero crossing signal Zc obtained from the zero crossing detecting unit 9, the control of the switching elements is performed at a timing delayed by the "transmission delay caused by filter circuit 8" with respect to an actual change in the polarity of the voltage of the alternating-current power output from the alternating-current power supply 1, which is a factor of malfunctions.

Figure 10:
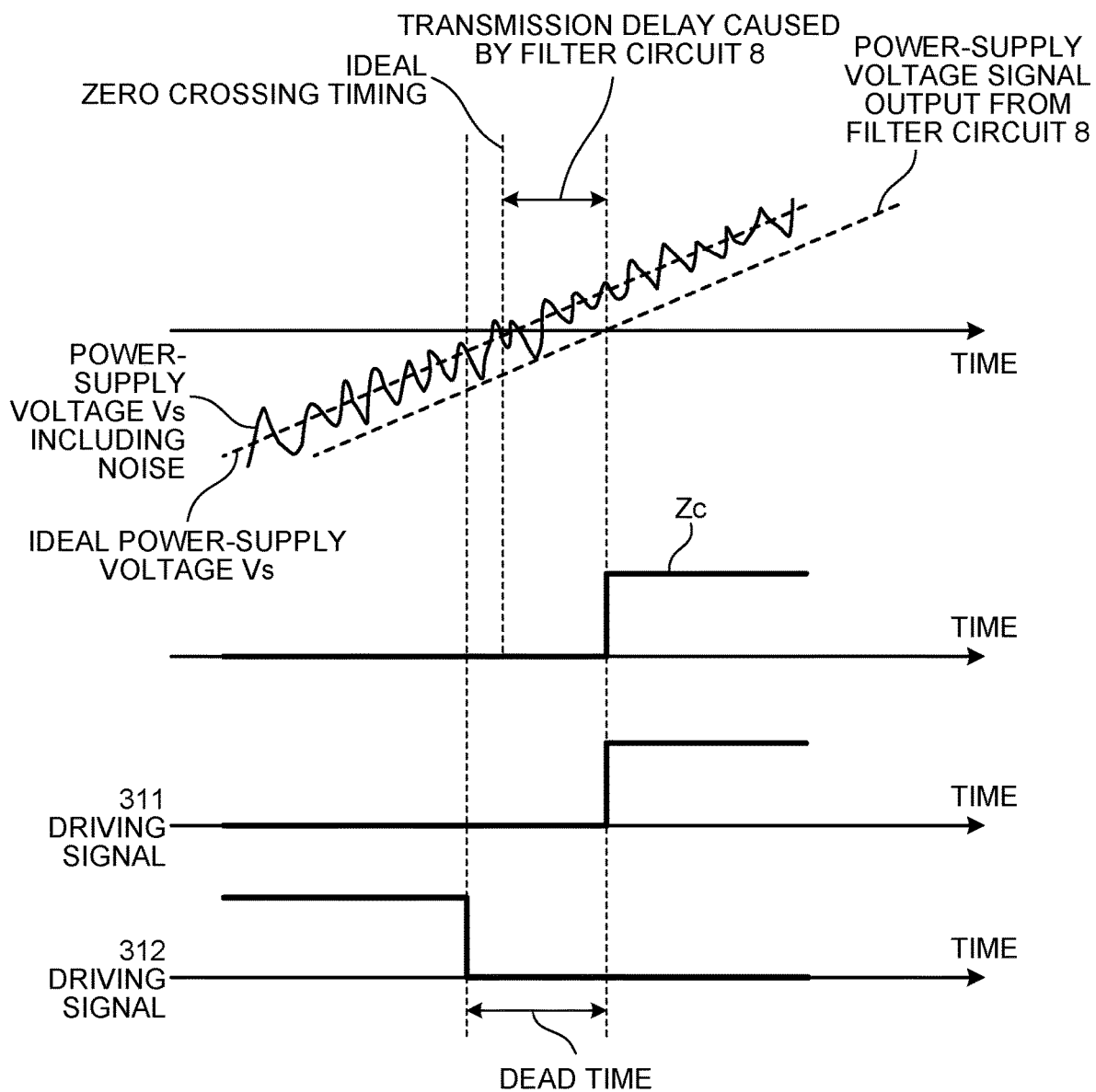
FIG. 10 is a chart illustrating an example of a dead time set for switching elements by the control unit according to the first embodiment.

Thus, in the present embodiment, the control unit 10 sets dead times that are longer than the "transmission delay caused by filter circuit 8" for the switching elements 311 and 312 controlled to be ON and OFF depending on the polarity of the voltage of the alternating-current power supply 1. FIG. 10 is a chart illustrating an example of a dead time set for the switching elements 311 and 312 by the control unit 10 according to the first embodiment. FIG. 10 also illustrates driving signals for turning the switching elements 311 and 312 ON and OFF in addition to the illustration of FIG. 8. A high level of each of the driving signals indicates an ON state of the switching element, and a low level thereof indicates an OFF state of the switching element. As illustrated in FIG. 10, the control unit 10 sets, as a dead time, a period between a time point prior to an actual zero crossing, which is delayed by the "transmission delay caused by filter circuit 8" from the "ideal zero crossing timing", by a time longer than the transmission delay caused by the filter circuit 8 and the zero crossing. Thus, the dead time of switching performed by the switching elements when a change in the voltage polarity of the alternating-current power supply 1 is included, can be said to be longer than the dead time of switching performed by the switching elements when no change in the polarity of the alternating-current power supply 1 is included. In addition, the dead time of switching performed by the switching elements when a change in the voltage polarity is included, is longer than the transmission delay caused by the filter circuit 8. The dead time is set to be longer than the transmission delay caused by the filter circuit 8 because variation due to noise of the power-supply voltage Vs including noise is considered.

Assume that the period with which the alternating-current power supply 1 outputs an alternating-current power, and the constants of the capacitor C and the resistor R used in the filter circuit 8 are known at the control unit 10. In addition, in the power converting apparatus 100, the zero crossing detecting unit 9 detects two zero crossings, which are a zero crossing at which the voltage polarity switches from positive to negative and a zero crossing at which the voltage polarity switches from negative to positive, in one period during which the alternating-current power supply 1 outputs the alternating-current power. The period with which the zero crossing detecting unit 9 detects a zero crossing is half the period with which the alternating-current power supply 1 outputs an alternating-current power. Thus, when a time point later than the timing of a first zero crossing obtained previously by half the period with which the alternating-current power supply 1 outputs an alternating-current power is referred to as a second zero crossing, the control unit 10 sets, as a dead time, a period between a time point prior to the second zero crossing by a period longer than the transmission delay caused by the filter circuit 8 and the second zero crossing. Note that, at the timing of a zero crossing first detected by the zero crossing detecting unit 9, the control unit 10 cannot set a dead time in advance with respect to the first zero crossing. Thus, the control unit 10 may, without turning the switching elements 311 and 312 ON at the timing when a zero crossing is first detected, set a dead time from the timing when a zero crossing is detected next, and perform normal control. This allows the power converting apparatus 100 to control ON and OFF of the switching elements depending on the voltage polarity of an alternating-current power while reducing or preventing malfunctions which are caused by noise included in an alternating-current voltage of the alternating-current power supply 1, a transmission delay caused by the filter circuit 8 or the like.

Figure 11:
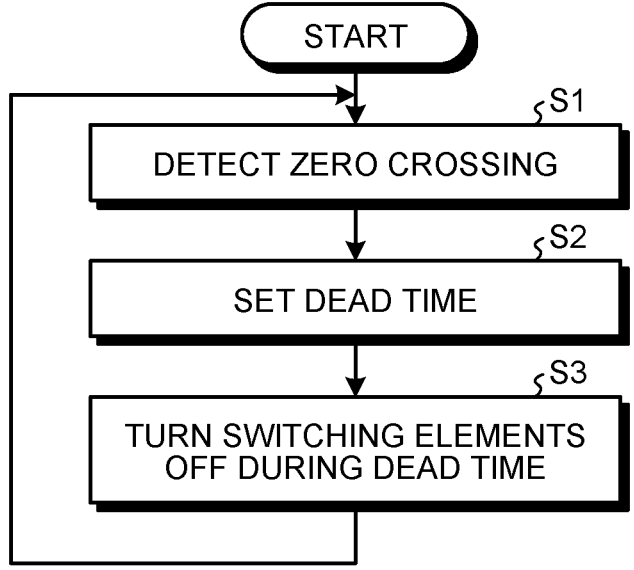
FIG. 11 is a flowchart illustrating operations of the control unit of the power converting apparatus according to the first embodiment for controlling ON and OFF of the switching elements depending on the polarity of the voltage of an alternating-current power supplied from an alternating-current power supply.

FIG. 11 is a flowchart illustrating operations of the control unit 10 of the power converting apparatus 100 according to the first embodiment for controlling ON and OFF of the switching elements 311 and 312 depending on the polarity of the voltage of an alternating-current power supplied from the alternating-current power supply 1. Upon detecting a zero crossing on the basis of a zero crossing signal Zc obtained from the zero crossing detecting unit 9 (step S1), the control unit 10 sets a dead time to be used at a timing of a next zero crossing (step S2). The control unit 10 generates driving signals for turning the switching elements 311 and 312 OFF during the set dead time to control the operations of the switching elements 311 and 312 (step S3). Alternatively, the control unit 10 may set all subsequent dead times on the basis of the timing at which the first zero crossing is detected instead of setting a dead time each time a zero crossing is detected.

The dead time set for the switching elements 311 and 312 is longer than the dead time set for the switching elements 321 and 322. In the description below, the dead time set for the switching elements 311 and 312 may be referred to as a first dead time, and the dead time set for the switching elements 321 and 322 may be referred to as a second dead time.

A configuration of a switching element will now be described. One of methods for increasing the switching speed of a switching element in the power converting apparatus 100 is a method of lowering the gate resistance of the switching element. As the gate resistance is smaller, the time for charging and discharging a gate input capacity is shorter, the turn-on period and the turn-off period are shorter, and the switching speed thus increases.

There is, however, a limit in reducing switching loss by lowering the gate resistance. Thus, the switching element is formed of a WBG semiconductor such as GaN or SiC, which can further reduce a loss per one switching, further improves the efficiency, and enables high-frequency switching. In addition, when high-frequency switching is enabled, the reactor 2 can be reduced in size, and the power converting apparatus 100 can be reduced in size and weight. In addition, when a WBG semiconductor is used for the switching element, the switching speed increases, and the switching loss is reduced, which can simplify heat radiation measures allowing the switching element to continue normal operations. In addition, when a WBG semiconductor is used for the switching element, the switching frequency can be a sufficiently high value, such as 16 kHz or higher, for example, and sound noise caused by switching can thus be reduced.

Furthermore, in a GaN semiconductor, two-dimensional electron gas is generated at an interface of a GaN layer and an aluminum-gallium-nitride layer, and the two-dimensional electron gas makes carrier mobility high. Thus, a switching element using the GaN semiconductor is capable of achieving high-speed switching. Note that, in a case where the alternating-current power supply 1 is a commercial power supply of 50 Hz or 60 Hz, the audible frequency is in a range from 16 kHz to 20 kHz, that is, a range from 266 to 400 times the frequency of the commercial power supply. The GaN semiconductor is suitable for switching at a frequency higher than the audible frequency. In a case where the switching elements 311, 312, 321, and 322 formed of silicon (Si), which is a major semiconductor material, are driven at a switching frequency of several tens kHz or higher, the ratio of the switching loss increases, and a heat radiation measure is essential. In contrast, in the case where the switching elements 311, 312, 321, and 322 are formed of a GaN semiconductor, the switching loss is very small even when the switching elements 311, 312, 321, and 322 are driven at a switching frequency of several tens kHz or higher, or more specifically at a switching frequency higher than 20 kHz. Thus, heat radiation measures become unnecessary, or a heat radiating member used for a heat radiation measure can be reduced in size, and the power converting apparatus 100 can be reduced in size and weight. In addition, when high-frequency switching is enabled, the reactor 2 can be reduced in size. Note that the switching frequency is preferably equal to or lower than 150 kHz so that the primary component of the switching frequency is not included in a range of measurement of noise terminal voltage standard.

In addition, WBG semiconductors are suitable for high-frequency switching because WBG semiconductors have a smaller capacitance than Si semiconductors, a recovery current caused by switching occurs less often, and the occurrence of a loss and noise caused by a recovery current can be reduced.

Note that, because SiC semiconductors have a smaller ON-resistance than GaN semiconductors, the switching elements 311 and 312 of the first arm 31 that is switched more often than the second arm 32 may be formed of GaN semiconductors, and the switching elements 321 and 322 of the second arm 32 that is switched less often may be formed of SiC semiconductors. In this manner, the characteristics of the SiC semiconductors and the characteristics of the GaN semiconductors can be utilized to possible extent. In addition, when the SiC semiconductors are used for the switching elements 321 and 322 of the second arm 32 that is switched less often than the first arm 31, the proportion of conduction loss to the loss of the switching elements 321 and 322 becomes larger, and turn-on loss and turn-off loss become smaller. As a result, an increase in heat generated with switching of the switching elements 321 and 322 is suppressed, the chip area of the switching elements 321 and 322 constituting the second arm 32 can be relatively reduced, and SiC semiconductors with which a chip manufacturing yield is small can be effectively used.

Alternatively, super junction (SJ)-MOSFETs may be used for the switching elements 321 and 322 of the second arm 32 that is switched less often. The use of SJ-MOSFETs can reduce disadvantages SJ-MOSFETs, which are high capacitance and high occurrence of recovery, while making use of low ON-resistance that is an advantage of SJ-MOSFETs. In addition, the use of SJ-MOSFETs can reduce the manufacturing cost of the second arm 32 as compared with use of WBG semiconductors.

In addition, WBG semiconductors have higher heat resistance than Si semiconductors, and can operate even at a high junction temperature. Thus, the use of WBG semiconductors allows the first arm 31 and the second arm 32 to be formed of small chips having a high thermal resistance. In particular, lower cost can be achieved by using SiC semiconductors, with which a chip manufacturing yield is small, for small chips.

In addition, even in a case where WBG semiconductors are driven at a high frequency of about 100 kHz, an increase in a loss generated in the switching elements is reduced or prevented, the loss reduction effect produced by miniaturization of the reactor 2 thus increases, and a highly efficient converter can be achieved in a wide output band, that is, under a wide load condition.

In addition, because WBG semiconductors have a higher heat resistance, and a higher permissible level of heat generation by switching due to imbalance in the loss between arms than Si semiconductors, WBG semiconductors are suitable for the first arm 31 in which a switching loss is produced by high-frequency driving.

Figure 12:
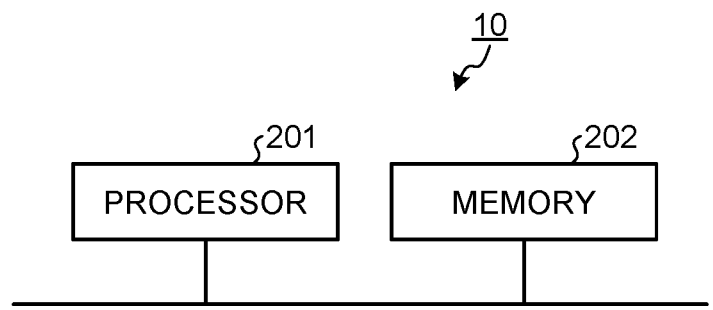
FIG. 12 is a diagram illustrating an example of a hardware configuration for implementing the control unit of the power converting apparatus according to the first embodiment.

Next, a hardware configuration of the control unit 10 of the power converting apparatus 100 will be described. FIG. 12 is a diagram illustrating an example of the hardware configuration for implementing the control unit 10 of the power converting apparatus 100 according to the first embodiment. The control unit 10 is implemented by a processor 201 and a memory 202.

The processor 201 is a central processing unit (CPU; also referred to as a central processing device, a processing device, a computing device, a microprocessor, a microcomputer, a processor, or a digital signal processor (DSP)), or a system large scale integration (LSI). Examples of the memory 202 can include nonvolatile or volatile semiconductor memories such as a random access memory (RAM), a read only memory (ROM), a flash memory, an erasable programmable read only memory (EPROM), and an electrically erasable programmable read only memory (EEPROM: registered trademark). Alternatively, the memory 202 is not limited thereto, and may be a magnetic disk, an optical disk, a compact disk, a mini disc, or a digital versatile disc (DVD).

As described above, according to the present embodiment, in the power converting apparatus 100, in the case where ON and OFF of the switching elements 311 and 312 are controlled depending on the polarity of the voltage of an alternating-current power from the alternating-current power supply 1, when a time point later than the timing of a first zero crossing obtained previously by half the period with which the alternating-current power supply 1 outputs an alternating-current power is referred to as a second zero crossing, the control unit 10 sets, as a first dead time a period between a time point prior to the second zero crossing by a period longer than the transmission delay caused by the filter circuit 8 and the second zero crossing. The first dead time is longer than the second dead time during which the switching elements 321 and 322 are both OFF when the switching elements 321 and 322 are turned ON and OFF by the PWM control. This allows the power converting apparatus 100 to control ON and OFF of the switching elements depending on the voltage polarity of an alternating-current power while reducing or preventing malfunctions caused by noise included in an alternating-current voltage of the alternating-current power supply 1, a transmission delay caused by the filter circuit 8 or the like.

While the case where the control unit 10 controls ON and OFF of the switching elements 311 and 312 of the first arm 31 depending on the polarity of the voltage of an alternating-current power from the alternating-current power supply 1, and controls ON and OFF of the switching elements 321 and 322 of the second arm 32 depending on the polarity of the current of an alternating-current power of the alternating-current power supply 1 has been described, this is an example, and the control unit 10 is not limited thereto. The control unit 10 may control ON and OFF of the switching elements 311 and 312 of the first arm 31 depending on the polarity of the current of an alternating-current power from the alternating-current power supply 1, and control ON and OFF of the switching elements 321 and 322 of the second arm 32 depending on the polarity of the voltage of an alternating-current power from the alternating-current power supply 1.

Second Embodiment

In the first embodiment, the dead time is a period between a zero crossing and a time point prior to the zero crossing by a time longer than the transmission delay caused by the filter circuit 8. When a plurality of power converting apparatuses 100 are produced, however, the amount of transmission delay caused by the filter circuit 8 may vary in different power converting apparatuses 100 depending on variations in constants of individual components used in the filter circuit 8. In a second embodiment, a period between a time point later than a zero crossing and the zero crossing, is also set as a dead time.

Figure 13:
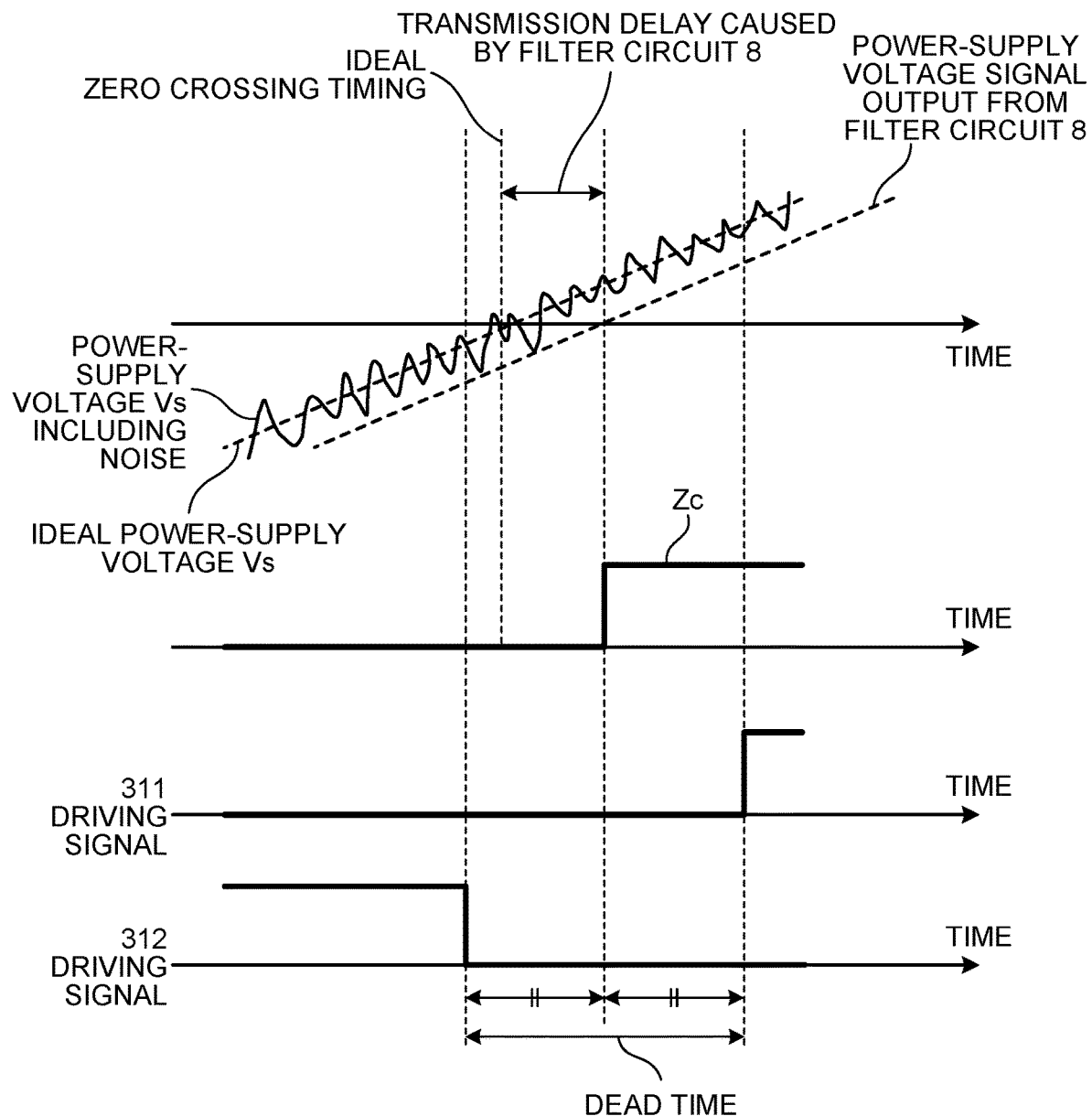
FIG. 13 is a chart illustrating an example of a dead time set for switching elements by a control unit according to a second embodiment.

In the second embodiment, the power converting apparatus 100 has a configuration similar to that in the first embodiment illustrated in FIG. 1. FIG. 13 is a chart illustrating an example of a dead time set for the switching elements 311 and 312 by the control unit 10 according to the second embodiment. As illustrated in FIG. 13, the control unit 10 further sets, with respect to an actual zero crossing which is delayed by the "transmission delay caused by filter circuit 8" from the "ideal zero crossing timing", a dead time which is a period between the actual zero crossing and a time point later than the actual zero crossing by a time longer than the transmission delay caused by filter circuit 8. In the description below, the dead time set in the second embodiment may be referred to as a third dead time.

In the second embodiment, the control unit 10 turns OFF both of the switching elements 311 and 312 during the first dead time and the third dead time. While the first dead time and the third dead time have the same length in FIG. 13, this is an example, and the first dead time and the third dead time are not limited thereto. The control unit 10 may set the third dead time to be longer than the first dead time or set the third dead time to be shorter than the first dead time.

As described above, according to the present embodiment, in the power converting apparatus 100, the control unit 10 also sets, as a third dead time, a period between a zero crossing and a time point later than the zero crossing by a time longer than the transmission delay caused by the filter circuit 8. The control unit 10 turns OFF both of the switching elements 311 and 312 during the first dead time and the third dead time. This allows the power converting apparatus 100 to further reduce or prevent malfunctions caused by noise included in an alternating-current voltage of the alternating-current power supply 1, a transmission delay caused by the filter circuit 8, or the like in view of the variation in the components used in the filter circuit 8 as compared with the first embodiment.

Third Embodiment

In the first embodiment, the power converting apparatus 100 reduces occurrence of malfunctions by setting a dead time during which the switching elements 311 and 312 are both OFF in view of a transmission delay caused by the filter circuit 8. In the power converting apparatus 100, however, an ON-period, that is, a conducting period of the switching elements 311 and 312 becomes shorter, and the loss increases. In a third embodiment, the power converting apparatus 100 reduces the loss by switching the switching elements 311 and 312 by the PWM control during the dead times set in the first embodiment.

Figure 14:
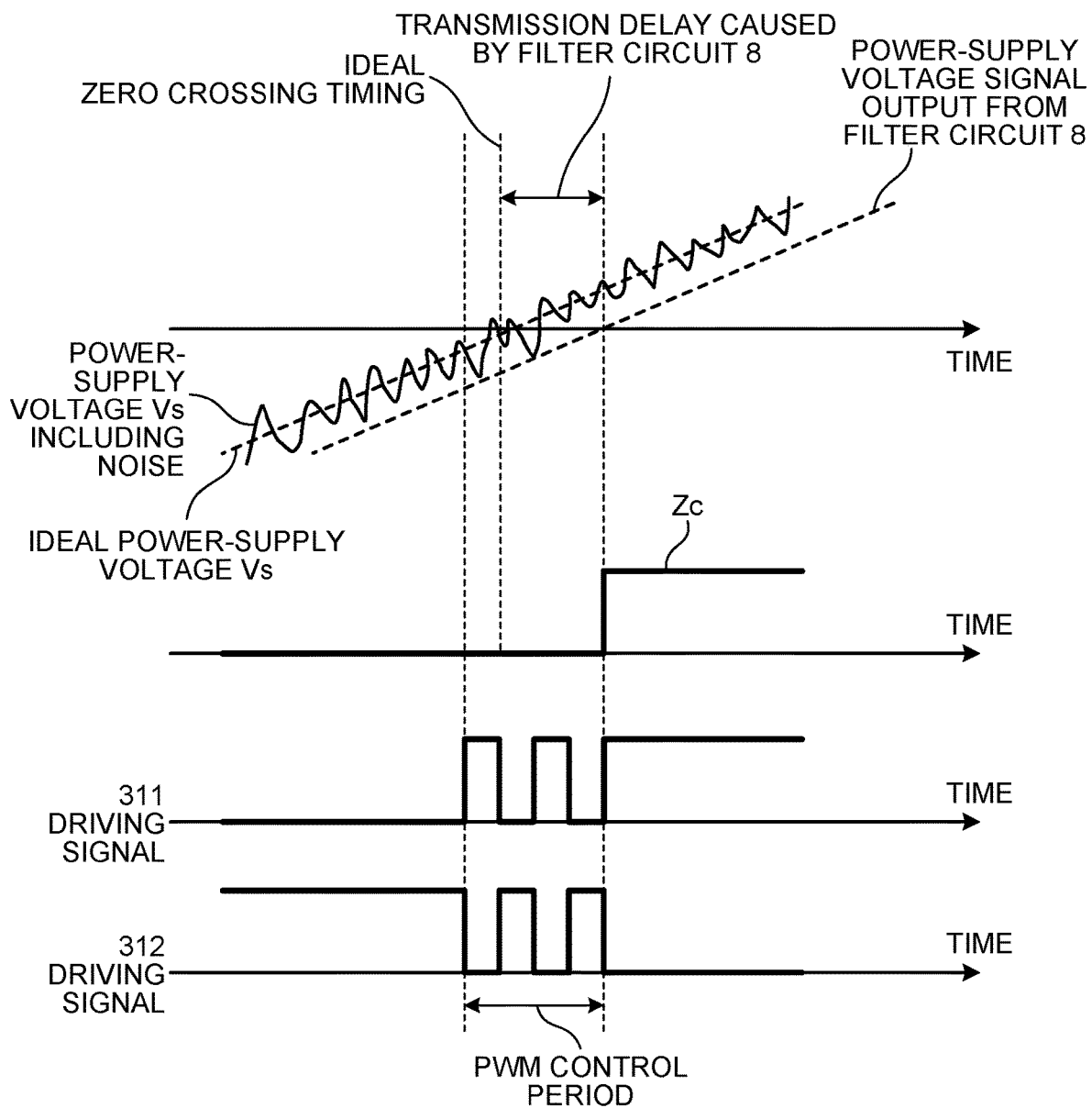
FIG. 14 is a chart illustrating an example of a PWM control period set for switching elements by a control unit according to a third embodiment.

In the third embodiment, the power converting apparatus 100 has a configuration similar to that in the first embodiment illustrated in FIG. 1. FIG. 14 is a chart illustrating an example of a PWM control period set for the switching elements 311 and 312 by the control unit 10 according to the third embodiment. The method for setting the "PWM control period" illustrated in FIG. 14 is similar to the method for setting the "dead time" illustrated in FIG. 10. Specifically, the start timing and the end timing of the "dead time" illustrated in FIG. 10 with respect to the "ideal zero crossing timing" are the same as the start timing and the end timing of the "PWM control period" illustrated in FIG. 14 with respect to the "ideal zero crossing timing".

Figure 15:
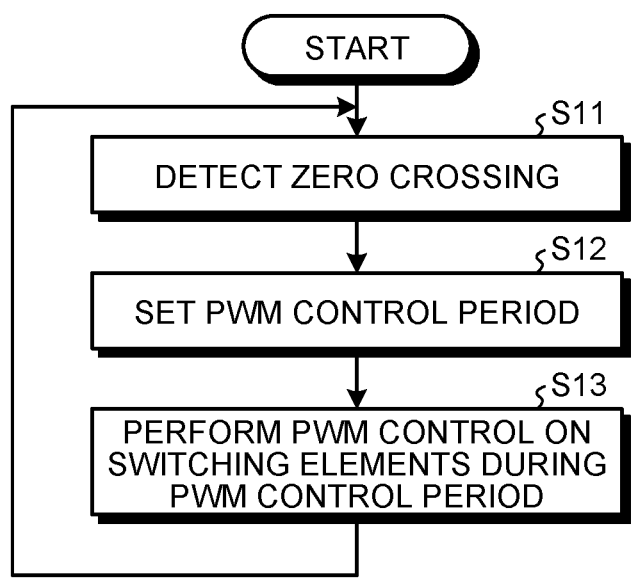
FIG. 15 is a flowchart illustrating operations of the control unit of the power converting apparatus according to the third embodiment for controlling ON and OFF of the switching elements depending on the polarity of the voltage of an alternating-current power supplied from an alternating-current power supply.

FIG. 15 is a flowchart illustrating operations of the control unit 10 of the power converting apparatus 100 according to the third embodiment for controlling ON and OFF of the switching elements 311 and 312 depending on the polarity of the voltage of an alternating-current power supplied from the alternating-current power supply 1. Upon detecting a zero crossing on the basis of a zero crossing signal Zc obtained from the zero crossing detecting unit 9 (step S11), the control unit 10 sets a PWM control period to be used at a timing of a next zero crossing (step S12). The control unit 10 generates driving signals for controlling the switching elements 311 and 312 by the PWM control during the set PWM control period to control the operations of the switching elements 311 and 312 (step S13). Alternatively, the control unit 10 may set all subsequent PWM control periods on the basis of the timing at which the first zero crossing is detected instead of setting a PWM control period each time a zero crossing is detected.

The PWM control period set for the switching elements 311 and 312 is longer than the dead time set for the switching elements 321 and 322. In the description below, the PWM control period set for the switching elements 311 and 312 may be referred to as a first control period. The control unit 10 complementarily turns the switching elements 311 and 312 ON and OFF once or more times during the first control period. Specifically, the control unit 10 complementarily turns two switching elements in one arm ON and OFF once or more times during the first control period, which is between a time point prior to a zero crossing of a power-supply voltage by a predetermined period and a time point later than the zero crossing of the power-supply voltage by a predetermined period. The first control period is longer than the transmission delay caused by the filter circuit 8.

As described above, according to the present embodiment, in the power converting apparatus 100, the control unit 10 performs ON/OFF control by the PWM control on the switching elements 311 and 312 during the first control period that is the same period as the first dead time set in the first embodiment. As a result, the power converting apparatus 100 produces effects similar to those in the first embodiment, and can reduce the loss as compared with the first embodiment.

Fourth Embodiment

In the third embodiment, the power converting apparatus 100 controls ON and OFF of the switching elements 311 and 312 by the PWM control during the same period as the dead time set in the first embodiment. Similarly, in a fourth embodiment, the power converting apparatus 100 controls ON and OFF of the switching elements 311 and 312 by the PWM control during the same period as the dead time set in the second embodiment.

Figure 16:
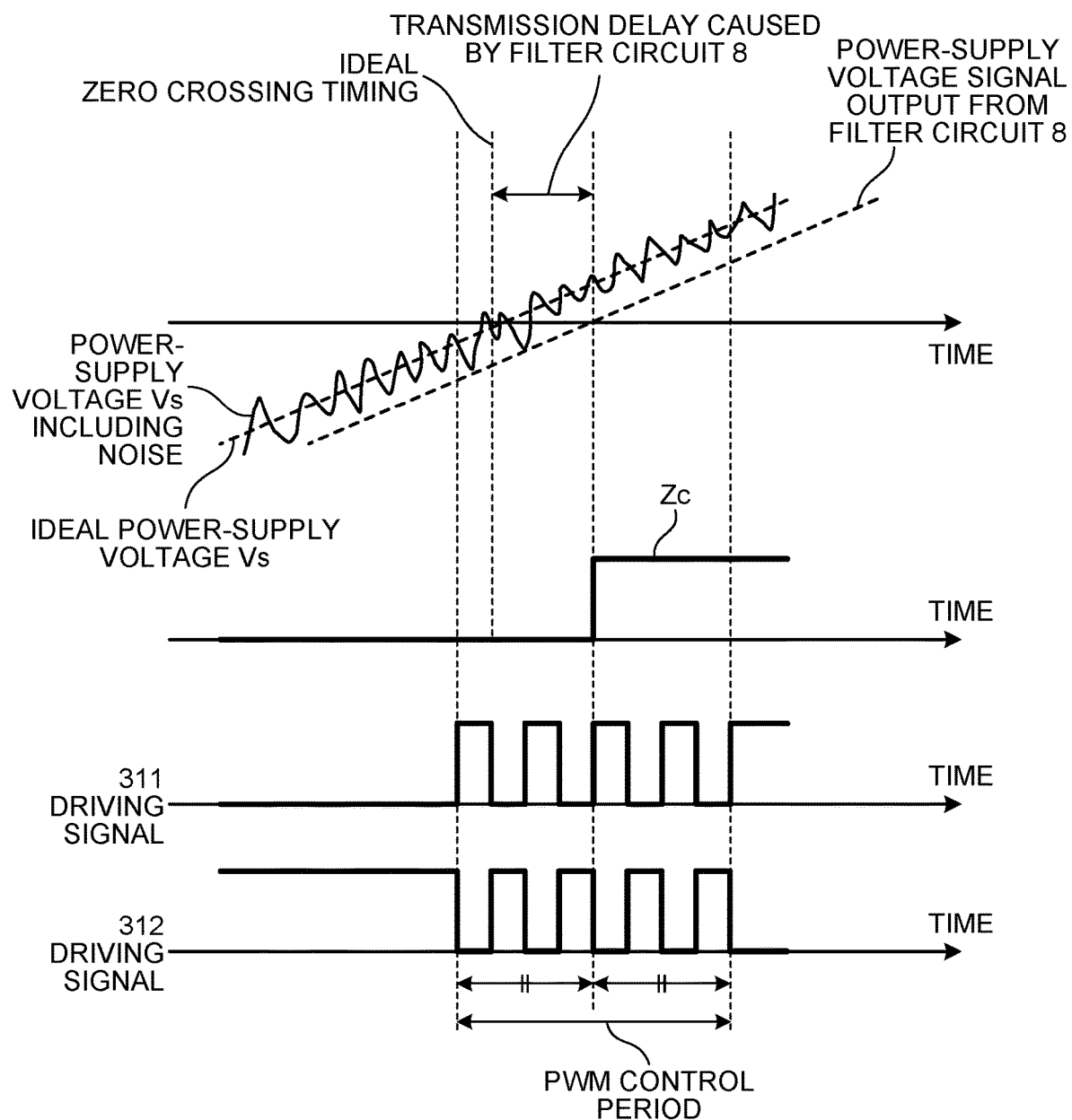
FIG. 16 is a chart illustrating an example of a PWM control period set for switching elements by a control unit according to a fourth embodiment.

In the fourth embodiment, the power converting apparatus 100 has a configuration similar to that in the first embodiment illustrated in FIG. 1. FIG. 16 is a chart illustrating an example of a PWM control period set for the switching elements 311 and 312 by the control unit 10 according to the fourth embodiment. The method for setting the "PWM control period" illustrated in FIG. 16 is similar to the method for setting the "dead time" illustrated in FIG. 13. Specifically, the start timing and the end timing of the "dead time" illustrated in FIG. 13 with respect to the "ideal zero crossing timing" are the same as the start timing and the end timing of the "PWM control period" illustrated in FIG. 16 with respect to the "ideal zero crossing timing". In the description below, a PWM control period that is additionally set in the fourth embodiment may be referred to as a second control period.

In the fourth embodiment, the control unit 10 performs the PWM control on the switching elements 311 and 312 during the first control period and the second control period. While the first control period and the second control period have the same length in FIG. 16, this is an example, and the first control period and the second control period are not limited thereto. The control unit 10 may set the second control period to be longer than the first control period or set the second control period to be shorter than the first control period.

As described above, according to the present embodiment, in the power converting apparatus 100, the control unit 10 also performs ON/OFF control by the PWM control on the switching elements 311 and 312 during the second control period that is the same period as the third dead time set in the second embodiment, in addition to the first control period. As a result, the power converting apparatus 100 produces effects similar to those in the second embodiment, and can reduce the loss as compared with the second embodiment.

Fifth Embodiment

In a fifth embodiment, a motor driving apparatus including the power converting apparatus 100 described in the first embodiment will be described.

Figure 17:
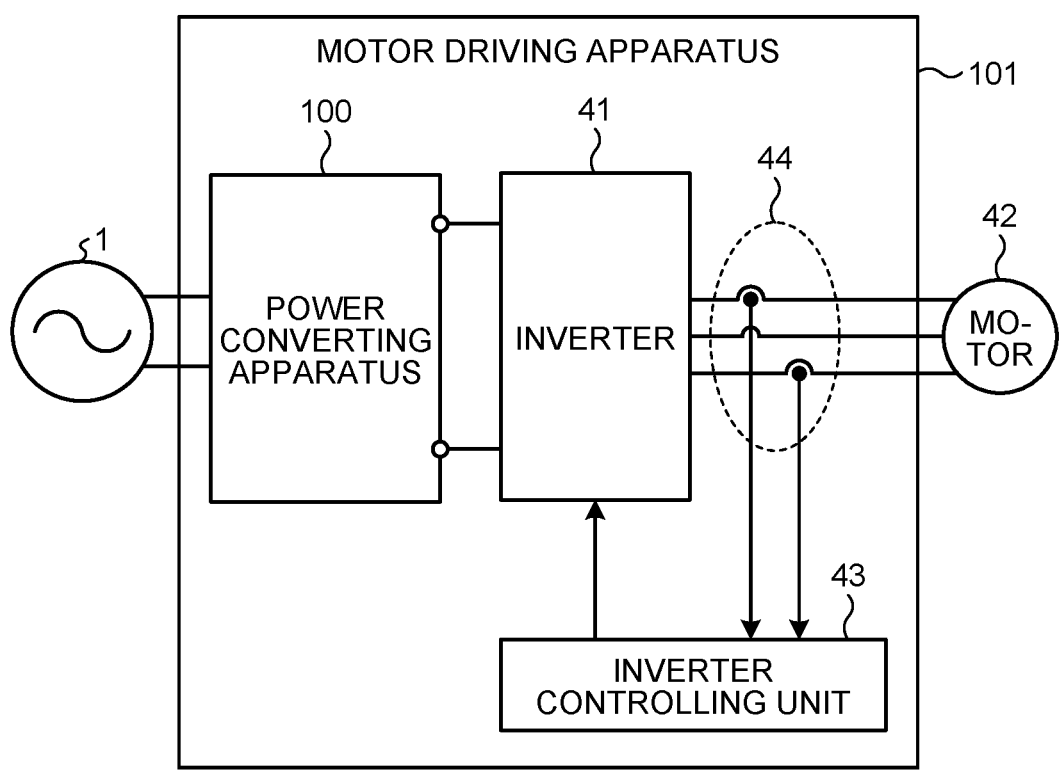
FIG. 17 is a diagram illustrating an example of a configuration of a motor driving apparatus according to a fifth embodiment.

FIG. 17 is a diagram illustrating an example of a configuration of a motor driving apparatus 101 according to the fifth embodiment. The motor driving apparatus 101 drives a motor 42 that is a load. The motor driving apparatus 101 includes the power converting apparatus 100 of the first embodiment, an inverter 41, a motor current detecting unit 44, and an inverter controlling unit 43. The inverter 41 drives the motor 42 by converting a direct-current power supplied from the power converting apparatus 100 into an alternating-current power and outputting the alternating-current power to the motor 42. While an example in which the load of the motor driving apparatus 101 is the motor 42 is described, this is an example, and a device connected to the inverter 41 may be any device including a device other than the motor 42, as long as an alternating-current power is input to the device.

The inverter 41 is a circuit that includes switching elements including insulated gate bipolar transistors (IGBTs), in a three-phase bridge configuration or a two-phase bridge configuration. The switching elements included in the inverter 41 are not limited to IGBTs, but may be switching elements made of WBG semiconductors, integrated gate commutated thyristors (IGCTs), field effect transistors (FETs), or MOSFETs.

The motor current detecting unit 44 detects currents flowing between the inverter 41 and the motor 42. The inverter controlling unit 43 generates PWM signals for driving the switching elements in the inverter 41 by using the currents detected by the motor current detecting unit 44 so that the motor 42 rotates at a desired rotating speed, and applies the PWM signals to the inverter 41. The inverter controlling unit 43 is implemented by a processor and a memory in a manner similar to the control unit 10. Note that the inverter controlling unit 43 of the motor driving apparatus 101 and the control unit 10 of the power converting apparatus 100 may be implemented by one circuit.

In a case where the power converting apparatus 100 is used in the motor driving apparatus 101, the bus voltage Vdc necessary for controlling the bridge circuit 3 changes depending on the operation state of the motor 42. Typically, as the rotating speed of the motor 42 is higher, the voltage output from the inverter 41 needs to be higher. The upper limit of the voltage output from the inverter 41 is limited by a voltage input to the inverter 41, that is, the bus voltage Vdc that is output from the power converting apparatus 100. A region in which the voltage output from the inverter 41 exceeds the upper limit that is limited by the bus voltage Vdc and is saturated is called an overmodulation region.

In the motor driving apparatus 101 as described above, the bus voltage Vdc need not be increased if the motor 42 operates in a low rotation range, that is, in a range in which the overmodulation region is not reached. In contrast, when the motor 42 rotates at high speed, the overmodulation region can be shifted toward higher rotation by increasing the bus voltage Vdc. As a result, the operation range of the motor 42 can be expanded toward higher rotation.

In addition, when the operation range of the motor 42 need not be expanded, the number of coil turns around a stator of the motor 42 can be increased by a corresponding amount. In the low rotation region, the increase in the number of coil turns makes the motor voltage generated across the coil ends higher, and lowers the current flowing in the coil accordingly, thereby reduces the loss caused by the switching operations of the switching elements in the inverter 41. For producing both effects of expansion of the operation range of the motor 42 and improvement in the loss in the low rotation region, the number of coil turns of the motor 42 is set to an appropriate value.

As described above, according to the present embodiment, the use of the power converting apparatus 100 enables the motor driving apparatus 101 with reduced imbalance in heat generation between the arms, high reliability, and high power to be achieved.

Sixth Embodiment

In a sixth embodiment, an air conditioner including the motor driving apparatus 101 described in the fifth embodiment will be described.

Figure 18:
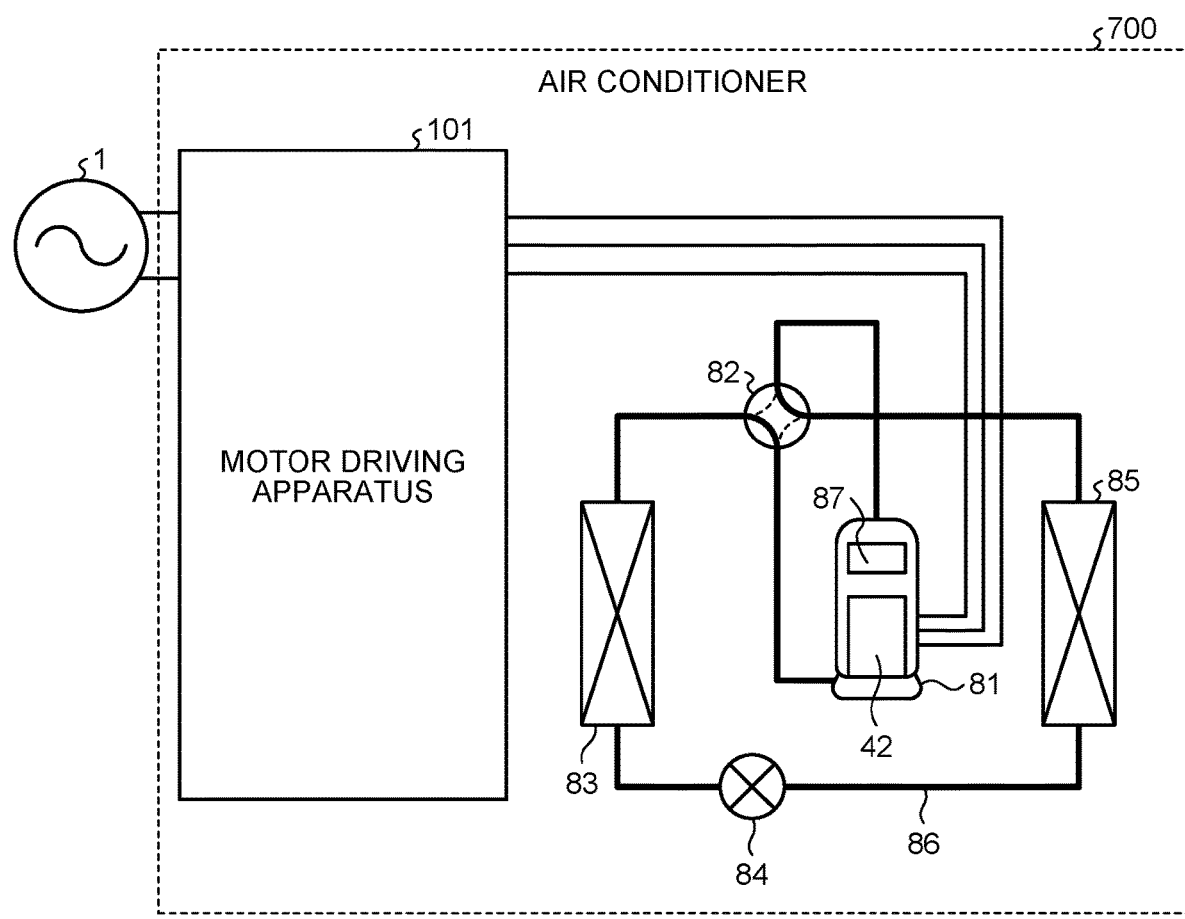
FIG. 18 is a diagram illustrating an example of a configuration of an air conditioner according to a sixth embodiment.

FIG. 18 is a diagram illustrating an example of a configuration of an air conditioner 700 according to the sixth embodiment. An air conditioner 700 is an example of a refrigeration cycle system, and includes the motor driving apparatus 101 and the motor 42 according to the fifth embodiment. The air conditioner 700 includes a compressor 81 including a compression mechanism 87 and the motor 42, a four-way valve 82, an external heat exchanger 83, an expansion valve 84, an internal heat exchanger 85, and refrigerant piping 86. The air conditioner 700 is not limited to a split air conditioner in which an outdoor unit is separated from an indoor unit, and may be an integrated air conditioner in which the compressor 81, the internal heat exchanger 85, and the external heat exchanger 83 are installed in one housing. The motor 42 is driven by the motor driving apparatus 101.

The compressor 81 includes therein the compression mechanism 87 for compressing the refrigerant, and the motor 42 for causing the compression mechanism 87 to operate. A refrigeration cycle is constituted by circulation of refrigerant through the compressor 81, the four-way valve 82, the external heat exchanger 83, the expansion valve 84, the internal heat exchanger 85, and the refrigerant piping 86. Note that the components of the air conditioner 700 can also be applied to such equipment as a refrigerator or a freezer including a refrigeration cycle.

In addition, in the sixth embodiment, an example of a configuration in which the motor 42 is used as a driving source of the compressor 81 and the motor 42 is driven by the motor driving apparatus 101 is described. The motor 42, however, may be applied to a driving source for driving an indoor unit fan and an outdoor unit fan, which are not illustrated, included in the air conditioner 700, and the motor 42 may be driven by the motor driving apparatus 101. Alternatively, the motor 42 may be applied to driving sources of the indoor unit fan, the outdoor unit fan, and the compressor 81, and the motor 42 may be driven by the motor driving apparatus 101.

In addition, because the operation of the air conditioner 700 is dominantly performed under an intermediate condition in which the power output is equal to or lower than half of a rated power output, that is, under a low power condition throughout the year, the contribution to the annual power consumption under the intermediate condition is high. In addition, in the air conditioner 700, the rotating speed of the motor 42 tends to be low, and the bus voltage Vdc required for driving the motor 42 tends to be low. Thus, operation of the switching elements used in the air conditioner 700 in a passive state is effective in terms of system efficiency. The power converting apparatus 100 capable of reducing the loss in a wide range of operation modes from the passive state to the high-frequency switching state, is therefore useful for the air conditioner 700. Although the reactor 2 can be reduced in size according to the interleaving method as described above, the frequency of operation of the air conditioner 700 under the intermediate condition is high, and thus the reactor 2 need not be reduced in size; rather, the configurations and operations of the power converting apparatus 100 are more effective in terms of harmonic wave reduction or prevention and the power-supply power factor.

In addition, because the power converting apparatus 100 can reduce the switching loss, an increase in the temperature of the power converting apparatus 100 is reduced, and the capacity of cooling a board mounted on the power converting apparatus 100 can be ensured even when the outdoor unit fan, which is not illustrated, is reduced in size. The power converting apparatus 100 is therefore suitable for use in the air conditioner 700 that is highly efficient and has a high power equal to or higher than 4.0 kW.

In addition, according to the present embodiment, the use of the power converting apparatus 100 reduces the imbalance in heat generation between the arms, which enables the reactor 2 to be reduced in size by virtue of high-frequency driving of the switching elements, and can reduce or prevent an increase in weight of the air conditioner 700. In addition, according to the present embodiment, high-frequency driving of the switching elements reduces the switching loss, and the air conditioner 700 with a low energy consumption rate and high efficiency can thus be achieved.

The configurations presented in the embodiments above are examples of the present invention, and can be combined with other known technologies or can be partly omitted or modified without departing from the scope of the present invention.

The invention claimed is:

1. A power converting apparatus comprising:
   a bridge circuit including at least two legs each including switching elements connected in series, the bridge circuit converting an alternating-current voltage output from an alternating-current power supply into a direct-current voltage;
   a current detector detecting a current from the alternating-current power supply;
   a zero crossing detector detecting a voltage polarity of the alternating-current power supply;
   a processor; and
   a memory storing a program which, when executed by the processor, performs processes of:
   controlling ON and OFF of the switching elements depending on outputs of the current detector and the zero crossing detector, wherein
   a dead time being set for switching and including a change in the voltage polarity of the alternating-current power supply, is longer than a dead time being set for switching and not including a change in the polarity.

2. The power converting apparatus according to claim 1, wherein
   the zero crossing detector detecting the voltage polarity of the alternating-current power supply includes a filter circuit, and
   the dead time for switching including a change in the voltage polarity is longer than a transmission delay caused by the filter circuit.

3. A motor driving apparatus for driving a motor, the motor driving apparatus comprising:
   the power converting apparatus according to claim 1; and
   an inverter converting a direct-current power output from the power converting apparatus into an alternating-current power, and outputting the alternating-current power to the motor.

4. An air conditioner comprising:
   a motor; and
   the motor driving apparatus according to claim 3.

5. A motor driving apparatus for driving a motor, the motor driving apparatus comprising:
   the power converting apparatus according to claim 2; and
   an inverter converting a direct-current power output from the power converting apparatus into an alternating-current power, and outputting the alternating-current power to the motor.

6. An air conditioner comprising:
   a motor; and
   the motor driving apparatus according to claim 5.

7. A power converting apparatus comprising:
   a bridge circuit including at least two legs each including switching elements connected in series, the bridge circuit converting an alternating-current voltage output from an alternating-current power supply into a direct-current voltage;
   a current detector detecting a current from the alternating-current power supply;
   a zero crossing detector detecting a voltage polarity of the alternating-current power supply;
   a processor; and
   a memory storing a program which, when executed by the processor, performs processes of:
   controlling ON and OFF of the switching elements depending on outputs of the current detector and the zero crossing detector, wherein
   two switching elements in one leg are complementarily turned ON and OFF once or more times during a first control period between a time point prior to a power-supply voltage zero crossing by a predetermined period and a time point later than the power-supply voltage zero crossing by a predetermined period.

8. The power converting apparatus according to claim 7, wherein
   the zero crossing detector detecting the voltage polarity of the alternating-current power supply includes a filter circuit, and
   the first control period is longer than a transmission delay caused by the filter circuit.

9. A motor driving apparatus for driving a motor, the motor driving apparatus comprising:
   the power converting apparatus according to claim 3; and
   an inverter converting a direct-current power output from the power converting apparatus into an alternating-current power, and outputting the alternating-current power to the motor.

10. A motor driving apparatus for driving a motor, the motor driving apparatus comprising:
    the power converting apparatus according to claim 8; and
    an inverter converting a direct-current power output from the power converting apparatus into an alternating-current power, and outputting the alternating-current power to the motor.

11. An air conditioner comprising:
    a motor; and
    the motor driving apparatus according to claim 9.

12. An air conditioner comprising:
    a motor; and
    the motor driving apparatus according to claim 10.

* * * * *